United States Patent
Oh et al.

(10) Patent No.: US 12,084,734 B2
(45) Date of Patent: Sep. 10, 2024

(54) PLATED STEEL SHEETS FOR HOT PRESS FORMING HAVING EXCELLENT HYDROGEN BRITTLENESS RESISTANCE AND IMPACT RESISTANCE, HOT PRESS FORMED PARTS, AND MANUFACTURING METHODS THEREOF

(71) Applicant: POSCO Co., Ltd, Pohang-si (KR)

(72) Inventors: Jin-Keun Oh, Gwangyang-si (KR); Seong-Woo Kim, Gwangyang-si (KR); Sang-Heon Kim, Gwangyang-si (KR); Hyo-Sik Chun, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/034,265

(22) PCT Filed: Dec. 3, 2021

(86) PCT No.: PCT/KR2021/018222
§ 371 (c)(1),
(2) Date: Apr. 27, 2023

(87) PCT Pub. No.: WO2022/131641
PCT Pub. Date: Jun. 23, 2022

(65) Prior Publication Data
US 2023/0383373 A1 Nov. 30, 2023

(30) Foreign Application Priority Data
Dec. 18, 2020 (KR) .......... 10-2020-0179068

(51) Int. Cl.
*C23C 2/02* (2006.01)
*C21D 6/00* (2006.01)
(Continued)

(52) U.S. Cl.
CPC .......... *C21D 8/0263* (2013.01); *C21D 6/002* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 6,296,805 B1 10/2001 Laurent et al.
6,911,268 B2 * 6/2005 Takada ............. C23C 2/02
148/533

(Continued)

FOREIGN PATENT DOCUMENTS

EP 3239337 A1 11/2017
JP 4288138 B2 7/2009
(Continued)

OTHER PUBLICATIONS

International Search Report dated Mar. 8, 2022, issued in International Patent Application No. PCT/KR2021/018222 (with English translation).
(Continued)

*Primary Examiner* — Daniel J. Schleis
(74) *Attorney, Agent, or Firm* — Morgan, Lewis & Bockius LLP

(57) ABSTRACT

Provided are plated steel sheets for hot press forming, hot press formed parts, and manufacturing methods thereof, the plated steel sheets comprising: a base steel sheet comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities; an aluminum or aluminum alloy plat-
(Continued)

ing layer disposed on at least one surface of the base steel sheet; and an Sn-enriched layer provided between the base steel sheet and the plating layer, wherein the Sn-enriched layer satisfies a specific relationship.

9 Claims, 3 Drawing Sheets

(51) Int. Cl.
| | |
|---|---|
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/48* | (2006.01) |
| *C22C 38/54* | (2006.01) |
| *C22C 38/58* | (2006.01) |
| *C23C 2/12* | (2006.01) |
| *C23C 2/40* | (2006.01) |

(52) U.S. Cl.
CPC ......... *C21D 8/0205* (2013.01); *C21D 8/0226* (2013.01); *C21D 8/0278* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/48* (2013.01); *C22C 38/54* (2013.01); *C22C 38/58* (2013.01); *C23C 2/02* (2013.01); *C23C 2/022* (2022.08); *C23C 2/024* (2022.08); *C23C 2/12* (2013.01); *C23C 2/40* (2013.01)

(56) References Cited

U.S. PATENT DOCUMENTS

| | | | |
|---|---|---|---|
| 10,144,196 B2* | 12/2018 | Nakajima | ................ C21D 9/00 |
| 10,640,840 B2* | 5/2020 | Kim | ........................ C22C 38/28 |
| 2017/0369974 A1 | 12/2017 | Kim et al. | |
| 2019/0003029 A1 | 1/2019 | Oh et al. | |
| 2022/0025479 A1 | 1/2022 | Kim et al. | |

FOREIGN PATENT DOCUMENTS

| | | |
|---|---|---|
| JP | 2012-041597 A | 3/2012 |
| JP | 2012-233249 A | 11/2012 |
| JP | 2019-506523 A | 3/2019 |
| KR | 10-2015-0074951 A | 7/2015 |
| KR | 10-1569505 B1 | 11/2015 |
| KR | 10-2016-0077538 A | 7/2016 |
| KR | 10-1696121 B1 | 1/2017 |
| KR | 10-2020-0076773 A | 6/2020 |
| WO | 2019/111931 A1 | 6/2019 |
| WO | 2019/160106 A1 | 8/2019 |
| WO | 2020/130666 A1 | 6/2020 |
| WO | 2021/095836 A1 | 5/2021 |

OTHER PUBLICATIONS

Office Action issued May 7, 2024 for Japanese Patent Application No. 2023-524936.
Extended European Search Report issued Jun. 11, 2024 for European Patent Application No. 21906946.5.

* cited by examiner

PLATED STEEL SHEETS FOR HOT PRESS FORMING HAVING EXCELLENT HYDROGEN BRITTLENESS RESISTANCE AND IMPACT RESISTANCE, HOT PRESS FORMED PARTS, AND MANUFACTURING METHODS THEREOF

CROSS-REFERENCE OF RELATED APPLICATIONS

This application is the U.S. National Phase under 35 U.S.C. § 371 of International Patent Application No. PCT/KR2021/018222, filed on Dec. 3, 2021, which in turn claims the benefit of Korean Application No. 10-2020-0179068, filed on Dec. 18, 2020, the disclosures of which applications are incorporated by reference herein.

TECHNICAL FIELD

The present disclosure relates to plated steel sheets for hot press forming having excellent hydrogen embrittlement resistance and impact resistance, hot press formed parts, and manufacturing methods thereof.

BACKGROUND ART

Hot press formed parts have recently been widely applied to structural members of automobiles for the purpose of improving fuel efficiency through weight reduction, protecting passengers, and the like. In particular, hot press formed parts may be used for bumpers, doors, pillar reinforcements, etc., that require ultra-high strength or energy absorption capacity. As such a hot forming technique, there is provided U.S. Pat. No. 6,296,805 (hereinafter, Patent Document 1).

Patent Document 1 discloses that, after Al—Si-based plated steel sheets are heated to 850° C. or higher, a structure of a member is formed into martensite by hot press forming and rapid cooling by pressing, to thereby secure ultra-high strength having high tensile strength. When applying the ultra-high strength steel for hot press forming, since the ultra-high strength steel is formed at high temperature, complex shapes may be formed easily and a weight reduction effect may be expected through the increase in strength by rapid cooling in the mold. However, the martensitic structure is known to have low resistance to hydrogen embrittlement. In particular, hot press formed parts have residual stress due to rapid cooling after heating, and at the same time, the amount of diffusible hydrogen in steel increases, so there is a risk of delayed fracture due to hydrogen embrittlement and thus the application of the member may be limited. In addition, since this amount of diffusible hydrogen moves to crack generation sites such as grain boundaries when stress occurs, impact resistance may deteriorate. Accordingly, various studies are being conducted to overcome this.

Additionally, changes in process parameters during coil manufacture may cause changes in global or local mechanical properties within the sheet. Therefore, a steel composition that is less sensitive to changes in manufacturing parameters for the manufacture of the plated steel sheets and the hot press formed parts having good mechanical properties and homogeneity is required.

(Patent Document 1) U.S. Pat. No. 6,296,805

DISCLOSURE

Technical Problem

The present disclosure provides plated steel sheets for hot press forming having excellent hydrogen embrittlement resistance and impact resistance, hot press formed parts, and manufacturing methods thereof.

The object of the present disclosure is not limited to the foregoing. Those skilled in the art to which the present disclosure pertains will have no difficulty in understanding the additional objects of the present disclosure from the contents throughout the present specification.

Technical Solution

In an aspect in the present disclosure,
a plated steel sheet for hot press forming may comprise:
a base steel sheet comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities;
an aluminum or aluminum alloy plating layer disposed on at least one surface of the base steel sheet; and
an Sn-enriched layer provided between the base steel sheet and the plating layer,
in which the plated steel sheet for hot press forming may satisfy the following relational expressions 1-1 and 1-2.

$$\frac{Sn_{max}}{Sn_{coat}} \geq 1.5 \qquad \text{[Relational Expression 1-1]}$$

[In the relational expression 1-1, the $Sn_{coat}$ denotes an average Sn content in the plating layer, and a unit is weight %. In addition, the $Sn_{max}$ denotes a maximum value of the Sn content in the Sn-enriched layer, and the unit is weight %.]

$$\int_{x1}^{x2} Sn(x)dx \geq 0.015 \qquad \text{[Relational Expression 1-2]}$$

[In the relational expression 1-2, the Sn(x) denotes the Sn content along an X-axis direction from one certain point in the plating layer to the base steel sheet side, x1 denotes an X-axis point at a boundary between the plating layer and the Sn-enriched layer, and x2 denotes the X-axis point at the maximum value of the Sn content in the Sn-enriched layer.]

In another aspect in the present disclosure,
a manufacturing method of a plated steel sheet for hot press may comprise: reheating a steel slab comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities at 1050 to 1300° C.;
obtaining a hot-rolled steel sheet by finishing rolling the heated steel slab at 750 to 950° C.;
coiling the hot-rolled steel sheet at 500 to 700° C.;
pickling the wound hot-rolled steel sheet so that a product of an acid concentration and a pickling time is 800 to 10,000 g/L*s;
annealing the pickled steel sheet at 700 to 900° C. in a dew point temperature condition of −75 to +20° C. in an annealing furnace; and
after the annealing, plating the steel sheet by passing the steel sheet through a plating bath made of aluminum or an aluminum alloy.

In still another aspect in the present disclosure,
a hot press formed part may comprise: a base steel sheet comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities;

an aluminum or aluminum alloy plating layer disposed on at least one surface of the base steel sheet; and an Sn-enriched layer provided between the base steel sheet and the plating layer, in which the hot press formed part may satisfy the following relational expressions 2-1 and 2-2.

$$\frac{Sn_{max}}{Sn_{coat}} \geq 1.8$$ [Relational Expression 2-1]

[In the relational expression 2-1, the $Sn_{coat}$ denotes an average Sn content in the plating layer, and a unit is weight %. In addition, the $Sn_{max}$ denotes a maximum value of the Sn content in the Sn-enriched layer, and the unit is weight %.]

$$\int_{x1}^{x2} Sn(x)dx \geq 0.02$$ [Relational Expression 2-2]

[In the relational expression 2-2, the Sn(x) denotes the Sn content along an X-axis direction from one certain point in the plating layer to the base steel sheet side, x1 denotes an X-axis point at a boundary between the plating layer and the Sn-enriched layer, and x2 denotes the X-axis point at the maximum value of the Sn content in the Sn-enriched layer.]

In yet another aspect in the present disclosure, a manufacturing method of a hot press formed part may comprise: after heat-treating the plated steel sheet for hot press forming described above in a temperature range of Ac3 to 950° C. for 1 to 1000 seconds, hot press forming the plated steel sheet.

Advantageous Effects

According to an aspect of the present disclosure, by forming a Sn-enriched layer between a base steel sheet and a plating layer to reduce the amount of diffusible hydrogen in steel, it is possible to provide plated steel sheets for hot press forming having excellent hydrogen embrittlement resistance and impact resistance, hot press formed parts, and manufacturing methods thereof.

Various and beneficial advantages and effects in the present disclosure are not limited to the above description, and may be more easily understood in the course of describing the specific exemplary embodiments in the present disclosure.

BEST MODE

Figure 1:
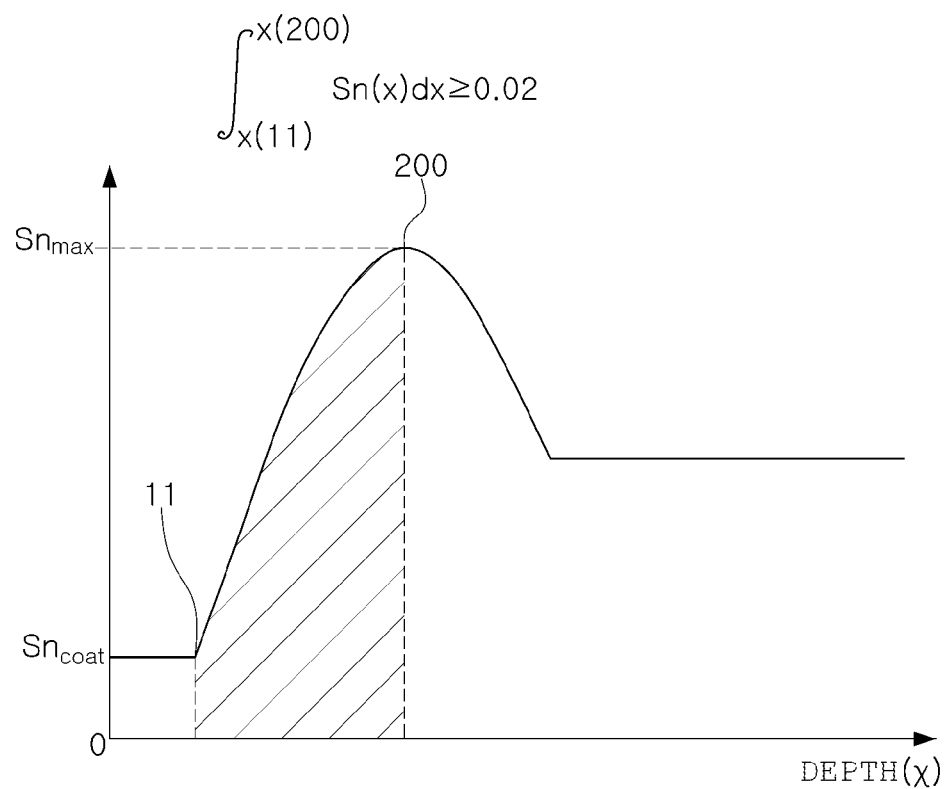
FIG. 1 is a diagram schematically illustrating a graph of a Sn-enriched layer gradient concentration in a region between a base steel sheet and a plating layer.

Hereinafter, exemplary embodiments of the present disclosure will be described. However, exemplary embodiments may be modified in various other forms, and the scope of the present disclosure is not limited to exemplary embodiments to be described below. In addition, these exemplary embodiments of the present disclosure are provided so that the present disclosure will completely describe the present disclosure to those skilled in the art.

Since diffusible hydrogen at a grain boundary is a cause of accelerating the occurrence of grain boundary cracks when stress occurs, a method of reducing the amount of diffusible hydrogen in steel after hot stamping is required.

Therefore, the present inventors analyzed the effects of various components comprising the addition of Sn, manufacturing conditions, texture, etc., by a method using analysis of the amount of diffusible hydrogen in steel which is an indicator of a hydrogen embrittlement resistance effect in steel for hot press forming and a 3-point bending test (VDA238-100) which is one of indicators that may indicate impact resistance. In this way, the present inventors were found that the amount of diffusible hydrogen may be reduced according to the formation of the Sn-enriched layer, and devised plated steel sheets for hot press forming, hot press formed parts having excellent hydrogen embrittlement resistance and impact resistance and manufacturing methods thereof.

Hereinafter, plated steel sheets for hot press forming and hot press formed parts according to one aspect of the present disclosure will be described in detail.

The plated steel sheet according to an aspect of the present disclosure may comprise: a base steel sheet comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities; an aluminum or aluminum alloy plating layer disposed on at least one surface of the base steel sheet; and an Sn-enriched layer provided between the base steel sheet and the plating layer.

First, the alloy composition of the base steel sheet of the present disclosure will be described in detail. It should be noted that in the present disclosure, when each element is expressed as content, the content means weight % unless otherwise specified.

Carbon (C): 0.07 to 0.5%

The C is an element that increases strength of a heat treated member and improves hardenability, and should be appropriately added as an essential element for strength control. When the C content is less than 0.07%, since it is difficult to secure sufficient hardenability, insufficient martensite may not be secured when a cooling rate is reduced, and impact resistance may be inferior due to excessive generation of ferrite. On the other hand, when the C content exceeds 0.5%, the strength may be excessively increased to cause brittleness and poor weldability. Therefore, the C content is preferably controlled in the range of 0.07 to 0.5%. However, in terms of further improving the above-described effect, the lower limit of the C content may be 0.078%, and the upper limit of the C content may be 0.348%.

Silicon (Si): 0.05 to 1%

The Si should be added as a deoxidizing agent in steelmaking, as well as a solid solution strengthening element and a carbide formation suppressing element. Therefore, the Si is added as an element that is effective for uniformizing an internal structure, contributes to an increase in strength of the hot press formed part, and effective for material uniformity. However, when the Si content is less than 0.05%, the above-described effect may not be expected, and the manufacturing cost and process cost for controlling the Si content are increased, which is not appropriate. On the other hand, when the Si content exceeds 1%, since the plating property is greatly deteriorated due to excessive Si oxide generated on the surface of the steel sheet during annealing, the Si is added to 1% or less. However, in terms of further improving the above-described effect, the lower limit of the Si content may be 0.17%, and the upper limit of the Si content may be 0.80%.

Manganese (Mn): 0.5 to 5%

The Mn needs to be added not only to secure desired strength due to the solid solution strengthening effect, but also to suppress ferrite formation during the hot press forming through the improvement in hardenability. When the Mn content is less than 0.5%, it is difficult to obtain a sufficient hardenability effect, and an excessive amount of other expensive alloying elements are required for insufficient hardenability, resulting in a significant increase in manufacturing costs. When the Mn content exceeds 5%, the band structure arranged in the rolling direction on the microstructure is deepened, resulting in the non-uniformity of the internal structure. As a result, the impact resistance may be inferior, so the Mn is added below 5%. However, in terms of further improving the above-described effect, the lower limit of the Mn content may be 0.55%, and the upper limit of the Mn content may be more preferably 4.4%.

Phosphorus (P): 0.001 to 0.015%

The P is present as an impurity in steel, and a high manufacturing cost is required for the minimum content of less than 0.001%, which is not preferable. However, when the P content exceeds 0.015%, the weldability of the hot press formed parts and the material properties due to high-temperature grain boundary segregation deteriorate, so the upper limit of the P content is set to 0.015%. Meanwhile, in terms of further improving the above-described effect, the lower limit of the P content may be 0.005%, and the upper limit of the P content may be preferably 0.012%.

Sulfur (S): 0.0001 to 0.02%

The S is an impurity, and the maximum content of the S is limited to 0.02% because the S is an element impairing the ductility, impact characteristics, and weldability of the member. In addition, when the minimum content of the S is less than 0.0001%, it is not preferable because manufacturing costs are greatly increased. Meanwhile, in terms of further improving the above-described effect, the lower limit of the S content may be 0.001%, and the upper limit of the S content may be 0.01%.

Aluminum (Al): 0.01 to 0.1%

The Al is an element that acts as a deoxidizer in steelmaking together with Si to increase the cleanliness of the steel. When the Al content is less than 0.01%, it is difficult to obtain the above-described effect, and when the Al content exceeds 0.1%, the high-temperature ductility due to excessive AlN precipitates formed during the continuous casting process is lowered, and slab cracks may occur, which may cause problems in manufacturing. Accordingly, the upper limit of the Al is set to 0.1%. Meanwhile, in terms of further improving the above-described effect, the lower limit of the Al content may be 0.020%, and the upper limit of the Al content may be 0.081%.

Cr: 0.01 to 1%

Like Mn, the Cr is added as an element for securing hardenability of steel and suppressing ferrite generation after hot press forming. When the Cr content is less than 0.01%, it is difficult to secure the above-described effect. On the other hand, when the Cr content exceeds 1%, the effect of improving hardenability compared to the amount added is insignificant, and excessive coarse iron carbide is formed, which may cause cracks when stress is applied and make the material inferior. As a result, the upper limit of the Cr content is set to 1%. Meanwhile, in terms of further improving the above-described effect, the lower limit of the Cr content may be 0.10%, and the upper limit of the Cr content may be 0.61%.

Nitrogen (N): 0.001 to 0.02%

The N is comprised as an impurity in steel. When the N content is less than 0.001%, excessive manufacturing costs are involved, and when the N content exceeds 0.02%, similar to the Al added, slab cracks due to AlN formation are likely to occur, so the upper limit of the N content is set to 0.02%. Meanwhile, in terms of further improving the above-described effect, the lower limit of the N content may be 0.003%, and the upper limit of the N content may be more preferably 0.005%.

Ti: 0.1% or Less (Comprising 0%)

The Ti is an element that is optionally added in the present disclosure, and may serve to protect B from becoming a compound for securing hardenability by generating TiN by combining with nitrogen remaining as an impurity in steel. In addition, through the formation of the TiC precipitates, precipitation strengthening and grain refinement effects may be expected. However, when the Ti content exceeds 0.1%, a large amount of coarse TiN is formed and the quality of steel is inferior, so the upper limit of the Ti content is set to 0.1%. Meanwhile, since the Ti is an optional element and therefore may not be added, the lower limit of the Ti content may be 0%, and the lower limit of the Ti content may be 0.01% and the upper limit of the Ti content may be 0.035% in terms of further improving the above-described effect.

B: 0.01% or Less Comprising 0%)

The B is an element that is optionally added in the present disclosure, and is an element that may effectively improve hardenability. When the B is added, the B may be segregated at a prior austenite grain boundary and suppress brittleness of the hot press formed parts due to the grain boundary segregation of P or/and S as impurities. However, when the B content exceeds 0.01%, the upper limit of the B content is set to 0.01% because it may cause brittleness in hot rolling due to the formation of $Fe_{23}CB_6$ composite compound. Meanwhile, since the B is an optional element and therefore may not be added, the lower limit of the B content may be 0%, and the lower limit of the B content may be 0.002% and the upper limit of the B content may be 0.008% in terms of further improving the above-described effect.

Sn: 0.01 to 0.1%

The Sn is a key element in manufacturing the hot press formed parts, and forms an Sn-enriched layer at an interface between a base steel sheet and a plating layer, reducing the hydrogen content occluded during the heat treatment and reducing the susceptibility to hydrogen delayed fracture. When the Sn content is less than 0.01%, it is difficult to expect the above-mentioned effect because a sufficiently enriched layer is not formed at the interface between the plating layer and base iron. When the Sn content exceeds 0.1%, the Sn is excessively precipitated at the grain boundary to cause the grain boundary fracture when stress occurs, resulting in material degradation. Therefore, the upper limit of the Sn content is preferably set to 0.1%. However, in terms of further improving the above-described effect, the lower limit of the Sn content may be 0.011%, and the upper limit of the Sn content may be 0.097%.

The balance other than the above-described components is iron (Fe), and any additional addition is not particularly limited as long as it is a component that may be comprised in the steel sheet for hot press forming. In addition, since the unintended impurities from raw materials or the surrounding environment may inevitably be mixed in a normal manufacturing process, the unintended impurities may not be excluded. Since these impurities are known to those skilled in the ordinary manufacturing process, not all of them are specifically mentioned in this specification.

In addition, the plating layer comprises an aluminum or aluminum alloy plating layer provided on at least one surface of the base steel sheet. The plating layer imparts corrosion resistance in the final hot press formed part. In the present disclosure, the type of the plating layer is not particularly limited, and the plating layer applied to the conventional plated steel sheet for hot press forming may be applied to the present disclosure without limitation. As an example, the plating layer may be an aluminum or aluminum alloy plating layer, and preferably, the plating layer may comprise Si: 6 to 12%, Fe: 1 to 4%, a balance of Al and inevitable impurities.

According to an aspect of the present disclosure, the plated steel sheet may comprise the Sn-enriched layer provided between the base steel sheet and the plating layer. This Sn-enriched layer may be expressed within the concentration gradient layer in the boundary region between the base steel sheet and the plating layer. The concentration gradient layer is a layer in which the concentration changes in the boundary region between the base steel sheet and the plating layer, and means a layer in which Fe varies by 0.3 wt %/μm or more in the range of 20 to 99% based on the gravimetric method in the thickness direction of the steel sheet. Meanwhile, the Sn-enriched layer is provided between the base steel sheet and the plating layer and is a region classified by the Sn content as the Sn is concentrated. The Sn-enriched layer and the plating layer may be distinguished by analyzing the change in the Sn content in the thickness direction of the base steel sheet side from one certain point in the plating layer using glow discharge optical emission spectrometry (GDS).

Figure 2:
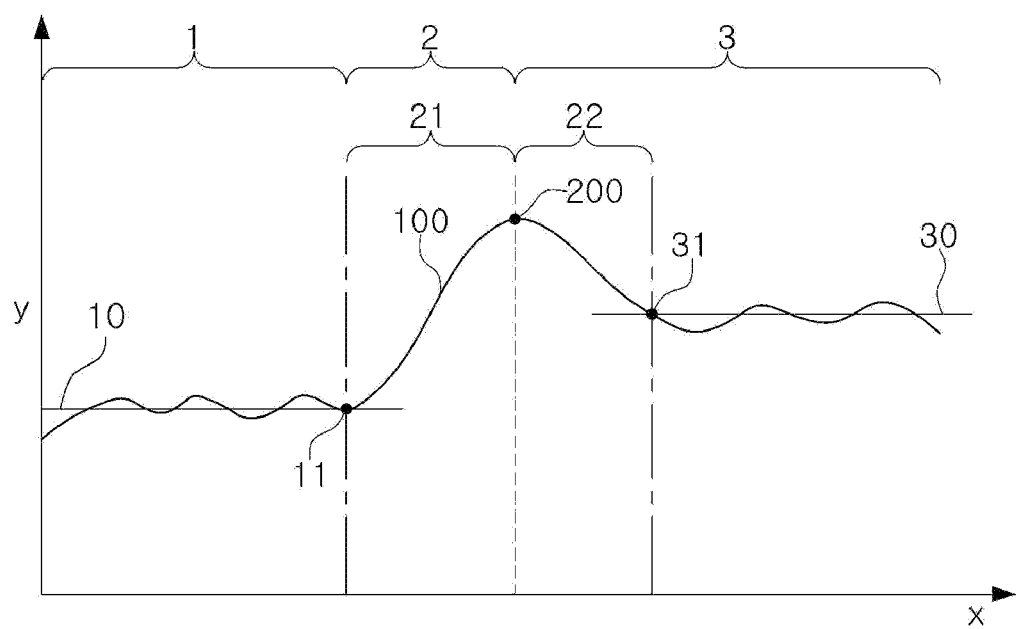
FIG. 2 is a diagram schematically illustrating the Sn concentration gradient graph by an exemplary glow discharge optical emission spectrometry (GDS) of the present disclosure.

Specifically, as illustrated in FIG. 2, it is determined based on a graph in which an x axis represents a straight line distance from an arbitrary position inside a plating layer 1 in a thickness direction of a base steel sheet 3 side, and a y axis represents the Sn content measured using the GDS.

For example, based on FIG. 2 schematically illustrating the above-described GDS measurement results, in an Sn content increasing section 21 in the (+) direction of the X-axis provided in the Sn-enriched layer 2 between the plating layer 1 and the base steel sheet 3, the Sn-enriched layer 2 is viewed from a last contact point 11 (in the thickness direction of the base steel sheet 3 side) in the X-axis (+) direction of an average Sn content line 10 of the plating layer and an Sn content line 100 measured using the GDS.

In this case, the average Sn content line 10 of the plating layer 1 may mean an extension line of the average Sn content line for the section from the point 8 μm away from the point 200 ($Sn_{max}$ point) where the Sn content is the maximum value in the Sn-enriched layer 2 to the point 15 μm away from the plating layer 1 side.

Similarly, for the Sn-enriched layer 2 and the base steel sheet 3 as in the above-described method, in an Sn content increasing section 22 in the (−) direction of the x axis provided in the Sn-enriched layer 2 between the base steel sheet 3 and the plating layer 1 measured using the GDS, the Sn-enriched layer 2 is viewed from a last contact point 31 (in the thickness direction of the plating layer 1 side) in an X-axis (−) direction of an average Sn content line 30 of the base steel sheet and the Sn content line 100 measured using the GDS.

In this case, the average Sn content line 30 of the base steel sheet 3 may mean an extension line of the average Sn content line for the section from the point 8 μm away from the point 200 ($Sn_{max}$ point) where the Sn content is the maximum value in the Sn-enriched layer 2 to the point 15 μm away from the base steel sheet 3 side.

As a result of intensive studies, the present inventors have found that reducing the amount of diffusible hydrogen occluded during the heat treatment of the press forming may suppress the occurrence of defects due to hydrogen delayed fracture. Specifically, during the step of heating a blank having the plating layer made of aluminum or aluminum alloy during the hot press forming, water vapor present in a heat treatment furnace is adsorbed on a surface of the blank. Subsequently, hydrogen generated by dissociation of water is occluded in the steel while having an austenite phase with high hydrogen solubility at high temperature. However, when the rapid cooling by the hot press forming occurs and changes to the martensite phase, the solubility of hydrogen is rapidly lowered, and the alloy plating layer formed as the plating layer is alloyed acts as an obstacle to prevent hydrogen from being released. Therefore, a significant amount of diffusible hydrogen content remains in the steel, to thereby increase the possibility of the occurrence of cracks due to hydrogen delayed fracture. Therefore, reducing the amount of diffusible hydrogen occluded during the heat treatment is an important factor for suppressing defects.

Furthermore, as a result of various studies, the inventors confirmed that the impact resistance tended to increase as the hydrogen content in steel decreased. This means that the diffusible hydrogen occluded in the steel during the heat treatment, in particular, the diffusible hydrogen present at the grain boundary is subjected to stress during bending, and acts to easily induce and propagate the grain boundary cracks. Therefore, by reducing the diffusible hydrogen content in steel, properties such as bendability and impact resistance may be improved.

In particular, the present inventors found that the formation of the Sn-enriched layer having an appropriate concentration and thickness between the base steel sheet and the plating layer made it possible to achieve this effect. This is because the Sn-enriched layer serves as an effective protective film to relatively reduce the amount of diffusible hydrogen occluded in the steel.

According to an aspect of the present disclosure, in order to effectively reduce the hydrogen content in steel to improve hydrogen embrittlement resistance and at the same time to secure excellent impact resistance, the plated steel sheets for hot press forming preferably satisfy the following relational expressions 1-1 and 1-2. In this case, the unit of the following relational expression 1-2 corresponds to [μm*wt %] (the same applies to the following relational expressions 2-2 and 2-3).

$$\frac{Sn_{max}}{Sn_{coat}} \geq 1.5 \qquad \text{[Relational Expression 1-1]}$$

[In the relational expression 1-1, the $Sn_{coat}$ represents an average Sn content in the plating layer, and a unit is weight %. In addition, the $Sn_{max}$ represents a maximum value of the Sn content in the Sn-enriched layer, and the unit is weight %.]

$$\int_{x1}^{x2} Sn(x)dx \geq 0.015 \qquad \text{[Relational Expression 1-2]}$$

[In the relational expression 1-2, the $Sn(x)$ represents the Sn content along an X-axis direction from one certain point in the plating layer to the base steel sheet side, x1 represents an X-axis point at a boundary between the plating layer and the Sn-enriched layer, and x2 represents the X-axis point at the maximum value of the Sn content in the Sn-enriched layer.]

That is, in order to exert the desired effect of the present disclosure, both the above-described relational expressions 1-1 and 1-2 need to be satisfied when the Sn concentration and thickness of the Sn-enriched layer provided between the base steel sheet and the plating layer are at a certain level or higher. In this case, the $Sn_{coat}$, $Sn_{max}$, $Sn(x)$, x1 and x2, etc., may be measured from data obtained when the Sn content change in the thickness direction of the base steel sheet is analyzed at one certain point in the plating layer using the above-described glow discharge optical emission spectrometry (GDS). In other words, the $Sn_{coat}$ may correspond to the average Sn content line 10 of the plating layer 1 described above in the GDS profile of FIG. 2 herein, and the $Sn_{max}$ may correspond to a point 200 where the Sn content in the enriched layer 2 is the maximum value in the GDS profile of FIG. 2 herein.

In the relational expression 1-1, when the value of $$\frac{Sn_{max}}{Sn_{coat}}$$

is less than 1.5, or in the relational expression 1-2, when the value of $\int_{x1}^{x2} Sn(x)dx$ is less than 0.015, the Sn concentration in the Sn-enriched layer or the formation thickness of the Sn-enriched layer is not sufficient, so it is difficult to expect to play a role as a protective film that relatively reduces the amount of diffusible hydrogen occluded in steel.

Meanwhile, in FIG. 1, the area corresponding to the relational expression 1-2 is illustrated as a hatched portion. That is, the area of the hatched portion in FIG. 1 described above represents the integral value (that is, in the present disclosure, it may mean the area of the corresponding region obtained by using the quadrature method) of $Sn(x)$ which is a function representing the change in the Sn content in the X-axis direction from one certain point in the plating layer from x1 (X-axis point at the boundary 11 between the plating layer and the Sn-enriched layer) to x2 (among the Sn-enriched layers, the X-axis point 200 at the maximum value of Sn content) to the base steel sheet side. In this case, the integral value may be obtained by calculation using the quadrature method per unit length (or unit depth) of the x axis of 0.01 μm.

Alternatively, according to an aspect of the present disclosure, more preferably, the lower limit of the $Sn_{max}/Sn_{coat}$ value defined by the relational expression 1-1 may be 1.53, and more preferably, the upper limit of the $Sn_{max}/Sn_{coat}$ value defined by the relational expression 1-1 may be 13.0.

Alternatively, according to an aspect of the present disclosure, more preferably, the lower limit of the value of $\int_{x1}^{x2} Sn(x)dx$ value defined by the relational expression 1-2 may be 0.018, and more preferably, the upper limit of the value of $\int_{x1}^{x2} Sn(x)dx$ defined by the relational expression 1-2 may be 0.35.

In addition, according to an aspect of the present disclosure, although not particularly limited, in the plated steel sheet, the thickness of the Sn-enriched layer may be in the range of 1 to 20 μm (i.e., 1 μm or more and 20 μm or less).

In the plated steel sheet, when the thickness of the Sn-enriched layer is less than 1 μm, even if the heat treatment for hot forming is performed thereafter, a sufficient Sn-enriched layer may not be generated, so it may be difficult to expect the desired effect of improving hydrogen embrittlement resistance and impact resistance. In addition, when the thickness of the Sn-enriched layer exceeds 20 μm, the impact resistance may be inferior by acting as a crack site when stress occurs as Sn excessively precipitates at the grain boundary after the hot press forming. Meanwhile, in terms of further improving the above-described effect, in the plated steel sheet, the lower limit of the thickness of the Sn-enriched layer may be 3 μm, and the upper limit of the thickness of the Sn-enriched layer may be 15 μm.

Meanwhile, as a result of intensive examination to further improve the physical properties of the plated steel sheet and the members of the present inventors, it was found that the performance is improved by concentrating an appropriate amount of Sn in the manganese segregation band existing in the base steel sheet of the plated steel sheet. That is, as a result of examining various conditions, the present inventors confirmed that this effect is further enhanced when the Sn concentration in the segregation band satisfies a certain level or more, or in addition, when the thickness of the Mn segregation band satisfies a certain level or less.

Specifically, according to an aspect of the present disclosure, in the plated steel sheet, the base steel sheet comprises the Mn segregation band, and the region in which the average Sn content of the Mn segregation band is 1.015 times or more compared to the average Sn content in the base steel sheet may be 50% or more (or, 60% or more) in an area fraction. By satisfying this, it is possible to reduce the generation of inclusions such as MnS, which mainly occur in the Mn segregation band, play a role in suppressing crack generation and propagation sites when stress occurs, and secure excellent impact resistance. In addition, when MnS is excessively produced, brittle fracture surfaces may be excessively developed. Therefore, when Sn is enriched, MnS may be reduced by satisfying the above-described configuration, to thereby reduce brittle fracture surfaces and more improve bendability.

In this case, the upper limit of the average Sn content in the Mn segregation band is not particularly limited, but may be, for example, 5 times or less than the average Sn content in the region of the base steel sheet other than the Mn segregation band. In addition, although not particularly limited, the upper limit of an area of a portion in which the average Sn content is 1.015 times or more of the average Sn content in the base steel sheet among the Mn segregation bands may be 90%.

Figure 5:
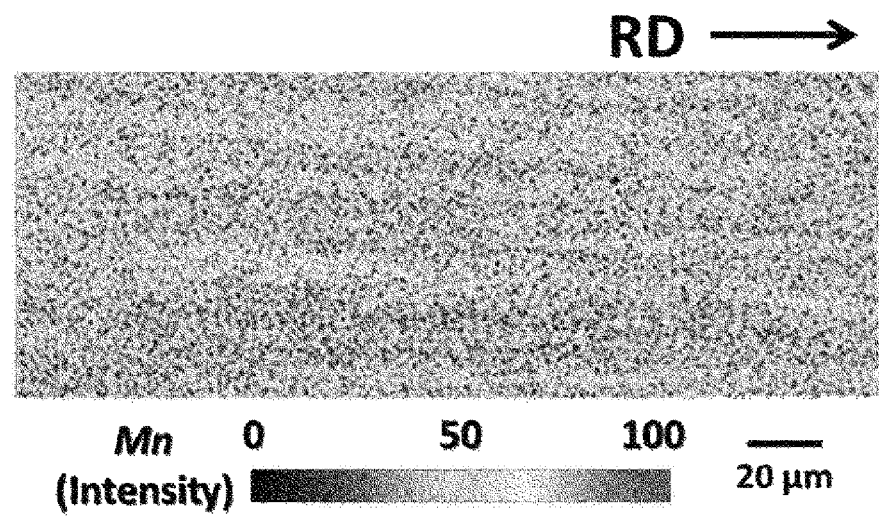
FIG. 5 is diagram illustrating EPMA component mapping results for Mn in the base steel sheet for Example 12 of the present application.

As illustrated in FIG. 5, the Mn segregation band may be identified using the EPMA component mapping result for Mn. Specifically, the average value of Mn intensity by the EPMA measured by heat-treating the plated steel sheet at a temperature of 1200° C. or higher for several hours and then rapidly cooling the plated steel sheet to remove the Mn segregation band is referred to as MnO. Thereafter, among the points measured in the EPMA, when a square with an area of 0.4 µm² is drawn vertically and horizontally around a specific point, if the area where the Mn intensity is 1.015 times or more than Mn0 among the points located within the square is 50% or more, the specific point is defined as the Mn segregation point, and if the area is less than 50%, the specific point is defined as not being a Mn segregation point. These Mn segregation points are collected, and a region drawn by connecting the outermost Mn segregation points with a straight line is referred to as the Mn segregation band.

In addition, the ratio (Sn2/Sn1) of an average Sn content (Sn2) of the Mn segregation band to an average Sn content (Sn1) of the base steel sheet may be measured using the ratio of intensity according to the result of Sn component mapping using EPMA.

In addition, according to an aspect of the present disclosure, the thickness of the Mn segregation band may be 20 µm or less, and by satisfying this, the impact resistance and bendability may be further improved. Since the impact resistance and bendability may be improved as the thickness of the Mn segregation band becomes thinner, the lower limit of the thickness of the Mn segregation band may not be separately limited. However, as an example, the lower limit of the thickness of the Mn segregation band may be 1 µm. In this case, the thickness of the Mn segregation band may be defined as a value obtained by measuring the average thickness in the thickness direction (direction perpendicular to the rolling direction of the steel sheet) from the Mn segregation band image determined by the above-described method. In this case, in terms of further improving the above-described effect, in the plated steel sheet, the lower limit of the thickness of the Mn segregation band may be 3.0 µm, or the upper limit of the thickness of the Mn segregation band may be 13.4 µm.

Meanwhile, hot press formed parts having excellent hydrogen embrittlement resistance and impact resistance may be manufactured by the hot press forming method to be described later for the plated steel sheets for hot press forming having the above-described configuration.

The hot press formed part according to an aspect of the present disclosure may comprise a base steel sheet having the same alloy composition as the base steel sheet of the above-described plated steel sheet; an aluminum or aluminum alloy plating layer provided on at least one surface of the base steel sheet; and an Sn-enriched layer provided between the base steel sheet and the plating layer, in which the hot press formed part satisfies the following relational expressions 2-1 and 2-2. In this case, the description of the base steel sheet, the plating layer, and the Sn-enriched layer may be applied in the same manner as described above. In this case, since the relational expressions 2-1 and 2-2 are empirically obtained values, the units may not be specifically determined, and it is sufficient if the units of each variable are satisfied.

$$\frac{Sn_{max}}{Sn_{coat}} \geq 1.8 \qquad \text{[Relational Expression 2-1]}$$

[In the relational expression 2-1, the $Sn_{coat}$ represents an average Sn content in the plating layer, and a unit is weight %. In addition, the $Sn_{max}$ represents a maximum value of the Sn content in the Sn-enriched layer, and the unit is weight %.]

$$\int_{x1}^{x2} Sn(x)dx \geq 0.02 \qquad \text{[Relational Expression 2-2]}$$

[In the relational expression 2-2, the Sn(x) represents the Sn content along an X-axis direction from one certain point in the plating layer to the base steel sheet side, x1 represents an X-axis point at a boundary between the plating layer and the Sn-enriched layer, and x2 represents the X-axis point at the maximum value of the Sn content in the Sn-enriched layer.]

In the present disclosure, when the plated steel sheet is heated for the hot press forming, the Sn-enrichment degree of the Sn-enriched layer is more deepened. Therefore, in the hot press formed part according to the present disclosure, the hydrogen embrittlement resistance and impact resistance may be improved by effectively reducing the hydrogen content in steel by satisfying the above relational expressions 2-1 and 2-2. In this case, in the hot press formed parts, the method of distinguishing the plating layer from the Sn-enriched layer and the base steel sheet from the Sn-enriched layer may be the same as the method of distinguishing the plated steel sheet described above.

Alternatively, according to an aspect of the present disclosure, more preferably, the lower limit of the $Sn_{max}/Sn_{coat}$ value defined by the relational expression 2-1 may be 1.83, and more preferably, the upper limit of the $Sn_{max}/Sn_{coat}$ value defined by the relational expression 2-1 may be 13.46.

Alternatively, according to an aspect of the present disclosure, more preferably, the lower limit of the value of $\int_{x1}^{x2} Sn(x)dx$ defined by the relational expression 2-2 may be 0.024, and more preferably, the upper limit of the value of $\int_{x1}^{x2} Sn(x)dx$ defined by the relational expression 2-2 may be 0.352.

Alternatively, according to an aspect of the present disclosure, more preferably, the following relational expression 2-3 may be satisfied, and thus, the hydrogen embrittlement resistance and impact resistance may be further improved.

$$\int_{x1}^{x2} Sn(x)dx \geq 0.1 \qquad \text{[Relational Expression 2-3]}$$

[In relational expression 2-3, the definitions of Sn(x), x1 and x2 are the same as those defined in relational expression 2-2]

According to an aspect of the present disclosure, in the hot press formed parts, the microstructure of the base steel sheet may comprise 5% or less of ferrite (comprising 0%) and a balance of martensite. Alternatively, other phases such as upper bainite, retained austenite, cementite, and pearlite may be additionally comprised in 1% or less.

According to an aspect of the present disclosure, the base steel sheet may comprise 5% or less (comprising 0%) of ferrite in area fraction, which may secure hardenability and sufficient cooling rate according to steel component control in hot forming to manage the ferrite fraction to 5% or less. Meanwhile, in the hot press formed parts, when the ferrite fraction of the base steel sheet exceeds 5%, not only the intensity is lowered, but also the local stress is concentrated in the relatively soft ferrite, which may promote crack propagation and greatly reduce the impact resistance.

Further, according to one aspect of the present disclosure, in the hot press formed parts, the thickness of the Sn-enriched layer may be 2 to 30 µm.

When the thickness of the Sn-enriched layer in the hot press formed part is less than 2 µm, it may not be able to effectively suppress hydrogen permeated into steel during hot forming, so the desired effect of improving hydrogen embrittlement resistance and impact resistance may not be sufficiently exhibited. In addition, when the thickness of the Sn-enriched layer in the hot press formed part exceeds 30 µm, Sn not only constitutes an enriched layer, but may also be excessively precipitated at the grain boundary of the surface layer of the base steel, which may promote the occurrence and propagation of cracks during the bending and reduce the impact resistance. Meanwhile, in terms of further improving the above-described effect, in the hot press formed part, the lower limit of the thickness of the Sn-enriched layer may be 3.4 μm, and the upper limit of the thickness of the Sn-enriched layer may be 25 μm.

In addition, according to an aspect of the present disclosure, the amount of diffusible hydrogen of the hot press formed part may be 0.4 ppm or less, and thus, excellent hydrogen embrittlement resistance may be secured. The amount of diffusible hydrogen of 0.4 ppm or less is because there is no cracking of parts even if a specimen is stressed by bending under the same yield stress of the material for 120 hours.

In addition, according to an aspect of the present disclosure, in the hot press formed part, the base steel sheet comprises the Mn segregation band, and the region in which the average Sn content of the Mn segregation band is 1.015 times or more compared to the average Sn content in the base steel sheet may be 50% or more (or, more preferably 60% or more) in an area fraction. By satisfying this, it is possible to reduce the generation of inclusions such as MnS, which mainly occur in the Mn segregation band, play a role in suppressing crack generation and propagation sites when stress occurs, and secure excellent impact resistance. In addition, when MnS is excessively produced, brittle fracture surfaces may be excessively developed. Therefore, when Sn is enriched, MnS may be reduced by satisfying the above-described configuration, to thereby reduce brittle fracture surfaces and more improve bendability.

In this case, the upper limit of the average Sn content in the Mn segregation band is not particularly limited, but may be, for example, 5 times or less than the average Sn content in the region of the base steel sheet other than the Mn segregation band. In addition, although not particularly limited, the upper limit of an area of a portion in which the average Sn content is 1.015 times or more of the average Sn content in the base steel sheet among the Mn segregation bands may be 95%.

In addition, according to an aspect of the present disclosure, in the hot press formed parts, the thickness of the Mn segregation band may be 15 μm or less, and by satisfying this, the impact resistance and bendability may be further improved. Since the impact resistance and bendability may be improved as the thickness of the Mn segregation band becomes thinner, the lower limit of the thickness of the Mn segregation band may not be separately limited. However, as an example, the lower limit of the thickness of the Mn segregation band may be 1.5 μm.

Meanwhile, in terms of further improving the above-described effect, in the hot press formed parts, the lower limit of the thickness of the Mn segregation band may be 4.1 μm, or the upper limit of the thickness of the Mn segregation band may be 15.0 μm.

In this case, in the hot press formed parts, for the definition of the Mn segregation band, the ratio of the average Sn content in the Mn segregation band to the average Sn content in the base steel sheet, and the measurement of the thickness of the Mn segregation band, the measurement method and standard of measurement in the above-described plated steel sheet may be equally applied.

Next, a method of manufacturing plated steel sheets for hot press forming according to another aspect of the present disclosure will be described.

The plated steel sheets for hot press forming according to an aspect of the present disclosure may comprise: reheating a steel slab comprising, in weight %, the above-described alloy composition at 1050 to 1300° C.; obtaining a hot-rolled steel sheet by finishing rolling the heated steel slab at 750 to 950° C.; coiling the hot-rolled steel sheet at 500 to 700° C.; pickling the wound hot-rolled steel sheet so that a product of an acid concentration and a pickling time is 800 to 10,000 g/L*s; annealing the pickled steel sheet at 700 to 860° C. in a dew point temperature condition of −75 to +20° C. in an annealing furnace; and after the annealing, plating the steel sheet by passing the steel sheet through a plating bath made of aluminum or an aluminum alloy.

Reheating Slab

First, the slab having the above-described alloy composition is reheated to 1050 to 1300° C. When the reheating temperature is less than 1050° C., since the slab structure is not sufficiently homogenized, it is difficult to re-dissolve the precipitated element when using the precipitated element. On the other hand, when the reheating temperature exceeds 1300° C., an excessive oxide layer is formed, resulting in an increase in manufacturing cost for removing the oxide layer and a high possibility of surface defects occurring after finish rolling.

Finish Rolling

The finish rolling needs to be performed at 750 to 950° C. When the finish rolling temperature is less than 750° C., ideal reverse rolling proceeds, and ferrite is introduced into the surface layer portion of the steel sheet, making it difficult to control the plate shape. On the other hand, when the finish rolling temperature exceeds 950° C., coarsening of hot-rolled grains may occur, and excessive hot scale may occur, which is not appropriate because post-process manufacturing costs for coping with the same increase.

Coiling

After the finish rolling is finished, the hot-rolled steel sheet is wound at 500 to 700° C. and then cooled to prepare a hot-rolled coil. When the coiling temperature is less than 500° C., martensite is formed in whole or in part on the steel sheet, so there is a problem in that it is difficult to control the shape of the coil, and the cold rolling property is lowered after the excessive increase of strength of the hot-rolled steel sheet. On the other hand, when the coiling temperature exceeds 700° C., coarse carbides are excessively formed, and the occurrence of cracks is promoted when stress is generated in the hot press formed parts, so there is a problem in that impact resistance is lowered.

Pickling

The wound hot-rolled steel sheet is pickled so that a product of an acid concentration and a pickling time is 800 to 10,000 g/L*s. The above-described Sn-enriched layer is formed on the steel sheet that has gone through the above reheating, finish rolling, and coiling. When, in the pickling process, the product of the acid concentration and the pickling time is applied within the range of 800 to 10,000 g/L*s, the Sn-enriched layer, which is the core of the present disclosure, is effectively protected, to thereby exhibit the effect of reducing the amount of diffusible hydrogen in steel.

Specifically, when the product of the acid concentration and the pickling time is less than 800 g/L*s, the scale generated during the finish rolling may not be sufficiently removed, which may cause problems in the quality of the product. On the other hand, when the product of the acid concentration and the pickling time exceeds 10,000 g/L*s, the whole or part of the Sn-enriched layer is lost during the pickling, which may not only fail to exert expected effects, but may also cause an increase in manufacturing costs. Therefore, the upper limit of the product of the acid concentration and the pickling time is set to 10,000 g/L*s.

However, when there is more than one pickling tank and the acid concentration and pickling time are different, the above value may be expressed by adding the product of the acid concentration and pickling time for each tank. Meanwhile, in terms of further improving the above-described effect, the lower limit of the product of the acid concentration and the pickling time may be 900 g/L*s, or the upper limit of the product of the acid concentration and the pickling time may be 4,200 g/L*s.

According to one aspect of the present disclosure, as an acid that may be used in the pickling step, those commonly used in the art may be applied. Representative examples comprise hydrochloric acid (HCl), sulfuric acid ($H_2SO_4$), etc. In particular, in the present disclosure, compared to the case of using other acids, the use of hydrochloric acid (HCl) has excellent pickling performance and economical process cost, and is easy to secure surface quality with less possibility of occurrence of foreign matter on the surface after the pickling.

Meanwhile, although not particularly limited, according to an aspect of the present disclosure, the acid concentration may be in the range of 40 to 500 g/L. When the acid concentration is less than 40 g/L, the surface scale generated during the hot rolling is not sufficiently removed for a limited pickling time, and thus, defects may occur in the surface layer portion of the steel sheet. On the other hand, when the acid concentration exceeds 500 g/L, it may be difficult to exert the desired effect of the invention in the final hot press formed member due to the loss of the Sn-enriched layer, and the surface layer defects due to over-acidification may occur. Meanwhile, in terms of further improving the above-described effect, the lower limit of the acid concentration may be 150 g/L, and the upper limit of the acid concentration may be 250 g/L.

In addition, although not particularly limited, according to one aspect of the present disclosure, the pickling time may be 5 to 60 seconds. When the pickling time is less than 5 seconds, the scale of the surface layer of the steel sheet is not sufficiently removed, which can cause defects in the surface layer portion, and when the pickling time exceeds 60 seconds, the Sn-enriched layer may be lost to reduce productivity and increase the process cost. Meanwhile, in terms of further improving the above-described effect, or the pickling time may be 5 to 25 seconds.

In addition, although not particularly limited, according to one aspect of the present disclosure, the pickling temperature may be 40 to 120° C. When the pickling temperature is less than 40° C., the pickling force is not sufficient, which may adversely affect the quality of the product. On the other hand, when the pickling temperature exceeds 120° C., not only fixed costs increase to maintain the pickling temperature at a high temperature, but also the increase in the amount of vaporization of the pickling solution due to the high temperature may increase the cost for replenishing the lost pickling solution. Meanwhile, in terms of further improving the above-described effect, the lower limit of the pickling temperature may be 50° C., or the upper limit of the pickling temperature may be 100° C.

Annealing

The above-described pickled steel sheet may be annealed at 700 to 900° C. in a dew point temperature condition of −75 to +20° C. in an annealing furnace. When the annealing temperature is less than 700° C., the recrystallization of the cold-rolled structure is not sufficiently completed, so the plate shape may be poor and the strength after plating is too high, which may cause mold wear during the blanking process. On the other hand, when the annealing temperature exceeds 900° C., the surface oxide formation is promoted during the annealing process, causing the defects on the Al—Si plating surface. Alternatively, in terms of further improving the effect of suppressing the mold wear and the plating surface defects during the blanking process, the annealing temperature may be 750 to 860° C. or 800 to 860° C.

In addition, the atmosphere during the annealing is preferably a non-oxidizing atmosphere, and a hydrogen-nitrogen mixed gas or the like may be used. In this case, the above-described dew point temperature of the atmospheric gas is performed at −75° C. or higher +20° C. or lower. When the dew point temperature is less than −75° C., there is a problem in that manufacturing cost increases because additional equipment for dew point control is required. On the other hand, when the dew point temperature exceeds +20° C., the annealed oxide is formed on the surface of the steel sheet during the annealing, which may cause the surface quality defects such as unplating. Meanwhile, in terms of further improving the above-described effect, during the annealing the lower limit of the dew point temperature may be −55° C., or the upper limit of the dew point temperature may be 0° C.

Plating

Al—Si plating is performed immediately after the annealing process. Specifically, after the annealing, the plated steel sheet may be manufactured by passing the hot-rolled steel sheet through a plating bath made of aluminum or an aluminum alloy. In this case, the plating conditions may be applied to the present disclosure without limitation as long as the plating conditions are generally applied to steel sheets for hot press forming, but as an example, the composition of the plating bath is Si: 6-12%, Fe: 1-4%, a balance of Al and inevitable impurities.

In this case, it is not particularly limited, but it is preferable that the plating amount in the plating is 15 to 140 $g/m^2$ based on the conventionally manufactured single side. It is difficult to secure the desired corrosion resistance of the hot press formed part when the plating amount is less than 15 $g/m^2$ on a single side basis, and when the plating amount exceeds 140 $g/m^2$, not only does manufacturing cost increase due to the excessive coating amount, but it is not easy to plate the coating amount uniformly in the entire width and length direction of the coil.

Cold Rolling

The manufacturing method of the plated steel sheets for hot press forming according to an aspect of the present disclosure may further comprise, after the pickling treatment described above, cold-rolling the hot-rolled steel sheet to manufacture a cold-rolled steel sheet.

Continuously Casting

The manufacturing method of plated steel sheets for hot press forming according to the present disclosure may further comprise, before heating a slab, continuous casting by light reduction, but is not particularly limited thereto. The present disclosure may reduce segregation and improve impact resistance by preparing a slab by applying light reduction during continuous casting. This is because, when the slab segregation occurs excessively, the segregation band is thickly concentrated until the final hot press formed part, and the impact resistance may be reduced due to the difference in hardness between the segregation band and the base steel sheet region other than the Mn segregation band and the formation of inclusions in the segregation band.

Accordingly, in order to prepare the slab, the light reduction needs to be performed prior to the final solidification position of the slab during the continuous casting, and the total reduction rate during the light reduction by the continuous casting is preferably controlled to 0.5 to 5%. When the total reduction ratio is less than 0.5% during the continuous casting, the reduction is hardly achieved and the center segregation is not sufficiently removed, resulting in poor impact resistance in the hot press formed part. On the other hand, when the total reduction ratio exceeds 5% during the continuous casting, there may be a problem with reduction roll equipment, which may promote equipment failure and deterioration.

The hot press formed parts having excellent hydrogen embrittlement resistance and impact resistance may be manufactured by performing the hot press forming on the plated steel sheets for hot press forming manufactured by the above-described manufacturing method. Specifically, a method of manufacturing a final member having excellent hydrogen embrittlement resistance and impact resistance through hot press forming and die quenching using the plated steel sheet manufactured by the above-described method will be described. A blank for hot forming is manufactured using the plated steel sheet manufactured according to the above-described steel composition and manufacturing method. The blank is heated within a temperature range of more than the temperature of the austenite single phase region, more specifically, the temperature of Ac3 and 975° C. or lower. In this case, when the heating temperature is less than the Ac3 temperature, it is difficult to secure the strength and impact resistance due to the presence of untransformed ferrite according to the ideal range. On the other hand, when the heating temperature exceeds 975° C., excessive oxide is generated on the surface of the member, making it difficult to secure spot weldability and increasing manufacturing costs for maintaining a high temperature. Meanwhile, in the present disclosure, the Ac3 transformation point temperature may be calculated by the following relational expression 3.

Ac3[° C.]=881−206×[C]+53×[Si]−15×[Mn]−1×[Cr]+ 41×[Mo]           [Relational Expression 3]

[In the above relational expression 3, [C], [Si], [Mn], [Cr], and [Mo] each independently represent the average weight % content for each element in parentheses comprised in the base iron, and among the elements, the content of elements not contained is calculated as "0."]

Hereinafter, the heated blank is preferably maintained in the above temperature range for 1 to 1000 seconds. When the holding time is less than 1 second, the uniform temperature distribution over the entire blank temperature may be difficult, causing material variation by location. On the other hand, when the holding time exceeds 1000 seconds, as in the case of exceeding the heating temperature, it may be difficult to secure the spot weldability due to the generation of excessive oxide on the surface of the member, and the manufacturing costs of the member may be increased.

The heated blank is transferred to a press, and the final member is manufactured by performing the hot press forming and the die quenching at a cooling rate of −20° C./s or higher. In this case, at a cooling rate of less than −20° C./s, a ferrite phase may be introduced during cooling to be generated at a grain boundary and the strength and impact resistance may deteriorate. There is no particular limitation on the above-described blank transfer, hot press forming, and cooling steps, and the commonly used hot press forming method may be applied as it is.

In the hot press formed parts manufactured in this way, the Sn-enriched layer is formed in the concentration gradient layer between the base steel sheet and the plating layer, so it is possible to manufacture the hot press formed parts having excellent hydrogen embrittlement resistance and impact resistance according to the decrease in the amount of diffusible hydrogen in steel.

MODE FOR INVENTION

Hereinafter, the present disclosure will be described in more detail with reference to Examples. However, it should be noted that the following Examples are only for illustrating the present disclosure in more detail and are not intended to limit the scope of the present disclosure. This is because the scope of the present disclosure is determined by the matters described in the claims and the matters reasonably inferred therefrom.

Experimental Example 1

The composition of the steel used for the present disclosure is shown in Table 1 below (corresponding to a balance of Fe and other impurities), and a slab having each composition were prepared by vacuum melting to a thickness of 60 mm. After maintaining the slab at a temperature of 1200° C. for 1 hour, the slab was hot rolled at a hot rolling end temperature of 900° C. and wound at a coiling temperature of 580° C. Thereafter, the pickling process was performed at the HCl concentration of 200 g/L and a pickling time of 20 seconds, and thus, after the product of the HCl concentration and the pickling time was collectively applied at 4,000 g/L·s within the inventive range, the annealing was performed under the conditions of Table 2 below, and the plating was performed by immersing in a plating bath made of Al-9% Si-2% Fe and a balance of a trace amount of impurities. In this exemplary embodiment, the hot press forming was performed at various temperatures, and after applying a heating time of 6 minutes and a transfer time to the mold of 10 seconds, the die quenching was applied.

Figure 3:
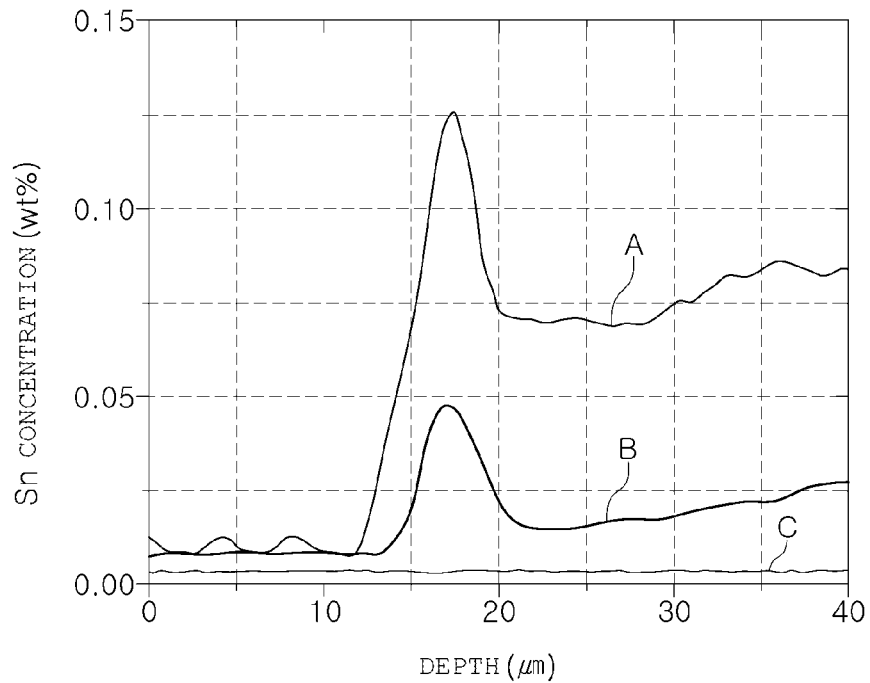
FIG. 3 is a diagram illustrating a concentration gradient graph for an Sn content in a thickness direction of a base steel sheet side from the plating layer measured according to the GDS for Examples and Comparative Examples of the present application.

Structure analysis for ferrite observation was performed on the specimen manufactured as described above, and GDS850A (model name, manufactured by LECO), DC, and FR equipment were used to confirm the Sn-enriched layer near the surface, and the glow discharge optical emission spectrometry (GDS) was used to detect the Sn-enriched layer at the interface between the base steel sheet and the plating layer as illustrated in FIG. 3. In this case, it was confirmed from the GDS test results that a concentration gradient layer varying by more than 0.3 wt %/μm within the range of Fe in the range of 20 to 99% based on the weight method in the thickness direction (meaning the direction perpendicular to the rolling direction) exists between the base steel sheet and the plating layer. In addition, it was confirmed that the Sn-enriched layer exists in this concentration gradient layer.

Based on this result, the parameters $$\frac{Sn_{max}}{Sn_{coat}}$$

and $\int_{x1}^{x2} Sn(x)dx$ were measured as illustrated in FIG. 1, and using the measured parameters, the parameter values of the relational expressions 1-1, 1-2, 2-1, and 2-2 for the plated steel sheet and the hot press formed part described in the table below were calculated.

In addition, for each Example and Comparative Example, in order to confirm the amount of diffusible hydrogen, it was measured using thermal desorption analysis (TDA) equipment (Bruker G8; model name). In this case, the temperature was raised to 400° C. at 20° C./min, and the time was maintained so that the diffusible hydrogen peak appears sufficiently to measure the diffusion hydrogen curve, and the total amount of diffusible hydrogen in the steel was obtained by integrating these curves.

Meanwhile, a three-point bending test applying the VDA238-100 standard, which is one of the indicators that may indicate the impact resistance of the hot press formed part, was performed. In addition, as shown in the following relational expression 4, P2 obtained by multiplying the maximum load value by the bending angle at the maximum load value was calculated, and the effect of improving the bendability was confirmed. In this case, when the P2 value was 35,000 kgf*° or more, it was marked as 'good', and when it was less than 35,000 kgf*°, it was marked as 'poor.' It could be understood that when the maximum load value or the corresponding bending angle increases during the above-described bending test, the occurrence of cracks in the event of the impact is relatively reduced, and thus, the impact resistance is improved. Therefore, in order to analyze the effect of improving the impact resistance for various components comprising the addition of Sn, it was expressed as P2.

$$P2 = \text{maximum load}[kgf] \times \text{maximum bending angle}[°] \quad [\text{Relational Expression 4}]$$

TABLE 1

| Steel type | C | Si | Mn | P | S | Al | Cr | N | Ti | B | Sn |
|---|---|---|---|---|---|---|---|---|---|---|---|
| A | 0.22 | 0.55 | 0.9 | 0.011 | 0.002 | 0.020 | 0.10 | 0.005 | 0.031 | 0.003 | 0.097 |
| B | 0.218 | 0.80 | 2.3 | 0.01 | 0.003 | 0.068 | 0.34 | 0.004 | 0.028 | 0.002 | 0.039 |
| C | 0.155 | 0.25 | 2.1 | 0.01 | 0.001 | 0.081 | 0.25 | 0.003 | 0.026 | 0.003 | 0.011 |
| D | 0.308 | 0.50 | 4.4 | 0.01 | 0.003 | 0.054 | 0.37 | 0.004 | 0.035 | 0.004 | 0.015 |
| E | 0.078 | 0.17 | 3.5 | 0.012 | 0.002 | 0.034 | 0.61 | 0.003 | 0.030 | 0.003 | 0.027 |
| F | 0.243 | 0.37 | 3.6 | 0.01 | 0.004 | 0.021 | 0.50 | 0.005 | 0.031 | 0.002 | 0.059 |
| G | 0.216 | 0.41 | 1.1 | 0.011 | 0.002 | 0.045 | 0.20 | 0.005 | 0.030 | 0.004 | 0.001 |
| H | 0.082 | 0.31 | 1.5 | 0.01 | 0.002 | 0.027 | 0.47 | 0.004 | 0.024 | 0.003 | 0.008 |
| I | 0.325 | 0.65 | 1.0 | 0.012 | 0.001 | 0.042 | 0.19 | 0.006 | 0.030 | 0.002 | 0.002 |

TABLE 2

| | Annealing condition | | [Relational Expression 1] $\dfrac{Sn_{max}}{Sn_{coat}}$ of | [Relational Expression 2] P1 of plated | |
|---|---|---|---|---|---|
| Steel type | Dew point temperature [° C.] | Annealing temperature [° C.] | plated steel sheet | steel sheet; $\int_{x1}^{x2} Sn(x)dx$ [μm * wt %] | Remarks |
| A | −40 | 790 | 12.51 | 0.345 | Example 1 |
| B | −20 | 810 | 5.04 | 0.098 | Example 2 |
| C | −55 | 840 | 1.53 | 0.018 | Example 3 |
| D | 0 | 830 | 2.10 | 0.027 | Example 4 |
| E | −10 | 800 | 3.65 | 0.060 | Example 5 |
| F | 15 | 770 | 7.80 | 0.188 | Example 6 |
| G | −30 | 790 | 1.01 | 0.001 | Comparative Example 1 |
| H | 0 | 755 | 1.20 | 0.001 | Comparative Example 2 |
| I | −50 | 835 | 1.01 | 0.001 | Comparative Example 3 |

TABLE 3

| Steel type | Hot press forming temperature [° C.] | [Relational Expression 2-1] $\dfrac{Sn_{max}}{Sn_{coat}}$ of member | [Relational Expression 2-2] P1 of member; $\int_{x1}^{x2} Sn(x)dx$ [% * μm] | Ferrite fraction [%] | Amount of diffusible hydrogen [ppm] | P2 [kgf * °] | Impact resistance | Remarks |
|---|---|---|---|---|---|---|---|---|
| A | 900 | 13.46 | 0.352 | 0 | 0.192 | 43,177 | Good | Example 1 |
| B | 900 | 5.50 | 0.106 | 0 | 0.325 | 37,538 | Good | Example 2 |
| C | 900 | 1.83 | 0.024 | 0 | 0.391 | 35,504 | Good | Example 3 |
| D | 900 | 2.75 | 0.032 | 0 | 0.375 | 35,809 | Good | Example 4 |
| E | 900 | 4.18 | 0.068 | 0 | 0.352 | 36,702 | Good | Example 5 |
| F | 900 | 8.51 | 0.178 | 15 | 0.270 | 39,550 | Good | Example 6 |

TABLE 3-continued

| Steel type | Hot press forming temperature [° C.] | [Relational Expression 2-1] $\frac{Sn_{max}}{Sn_{coat}}$ of member | [Relational Expression 2-2] P1 of member; $\int_{x1}^{x2} Sn(x)dx$ [% * μm] | Ferrite fraction [%] | Amount of diffusible hydrogen [ppm] | P2 [kgf * °] | Impact resistance | Remarks |
|---|---|---|---|---|---|---|---|---|
| G | 900 | 1.02 | 0.001 | 0 | 0.427 | 34,471 | Poor | Comparative Example 1 |
| H | 900 | 1.75 | 0.002 | 0 | 0.405 | 34,507 | Poor | Comparative Example 2 |
| I | 880 | 1.01 | 0.001 | 0 | 0.441 | 34,361 | Poor | Comparative Example 3 |

Ac3[° C.]=881−206×[C]+53×[Si]−15×[Mn]−1×[Cr]+41×[Mo]

As can be seen in Tables 1 to 3, in Examples 1 to 6 satisfying the alloy composition and manufacturing conditions of the present disclosure, the values of the relational expressions 1-1, 1-2, 2-1 and 2-2 satisfied the inventive range, so it was confirmed that the amount of diffusible hydrogen in the steel was reduced, and at the same time, the impact resistance was excellent.

On the other hand, in the case of Comparative Examples 1 to 3, the Sn content in the steel fell short of the inventive range, and the values of $$\frac{Sn_{max}}{Sn_{coat}}$$

and $\int_{x1}^{x2} Sn(x)dx$ did not satisfy the inventive range in the plated steel sheet and hot press formed part, and thus, the permeation of diffusible hydrogen in steel was not effectively suppressed, so the impact resistance was poor.

Figure 4:
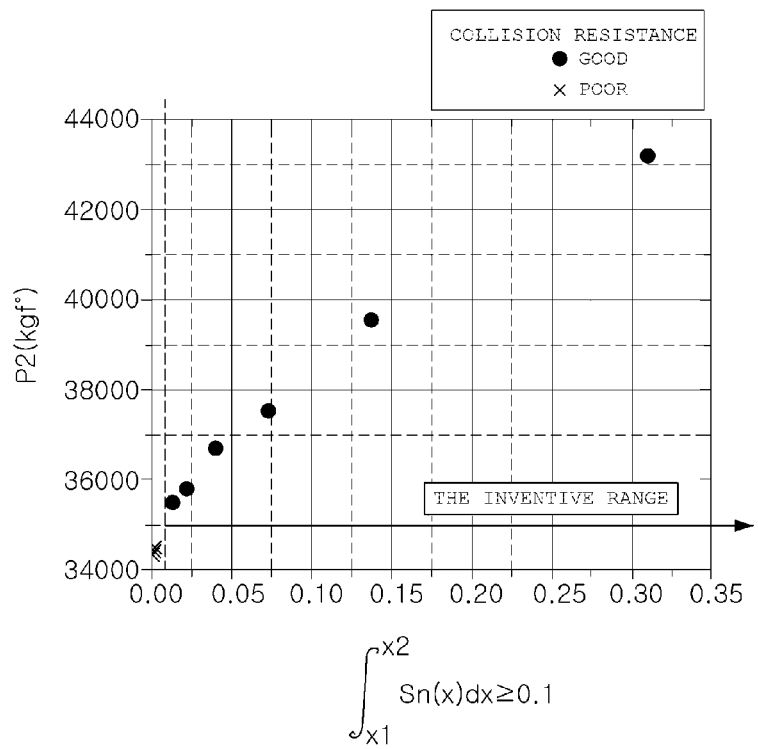
FIG. 4 is a diagram illustrating a graph of a change in the amount of diffusible hydrogen according to parameter $\int_{x1}^{x2} Sn(x)dx$ for a hot press formed part, which is an example of the present disclosure.

Meanwhile, for the above-described Examples and Comparative Examples, it could be clearly confirmed that the effect of improving impact resistance according to the formation of the Sn-enriched layer is illustrated in FIG. 4, and the impact resistance tends to increase according to the formation of the Sn-enriched layer of the hot press formed part. Through this, as the P1 value increases, it can be seen that the Sn-enriched layer serves as an effective protective film to reduce the amount of diffusible hydrogen in the steel to secure the excellent hydrogen embrittlement resistance and at the same time to secure the excellent impact resistance.

Experimental Example 2

Specimens were prepared in the same manner as in Experimental Example 1 described above, except that the pickling concentration, the pickling time, and the hot press forming temperature were changed to the conditions in Table 4 below. In this case, the pickling temperature was applied collectively at 80° C.

For each Example and Comparative Example in Table 4 below, the values of the relational expressions 1-1, 1-2, 2-1 and 2-2 were measured in the same manner as in Experimental Example 1 described above, and are shown in Table 5 below. In addition, regarding the plated steel sheets (or hot press formed parts) for each Example and Comparative Example, based on the data obtained by analyzing the change in the Sn content by the GDS in the thickness direction of the base steel sheet for any 10 points on the surface of the plating layer, the thickness of the Sn-enriched layer was measured by applying the same method described in the specification (in other words, in FIG. 2 which is a schematic diagram, the straight line distance in the thickness direction from the last contact point 11 in the X-axis (+) direction of the average Sn content line 10 of the plating layer and the Sn content line 100 by the GDS in the Sn content increasing section 21 in the X-axis (+) direction of the Sn-enriched layer 2 to in the last contact point 31 in the X-axis (−) direction of the average Sn content line 30 of the base steel sheet and the Sn content line 100 by the GDS in the Sn content increasing section 22 in the X-axis (−) direction of the Sn-enriched layer 2 was measured.) The average thickness of the Sn-enriched layer for the 10 points was measured and shown in Table 5 below.

For the evaluation of each Example and Comparative Example, the amount of diffusible hydrogen and the impact resistance were evaluated in the same manner as in Experimental Example 1 described above, and it was evaluated whether the hot scale remains after pickling to additionally evaluate the surface properties (i.e., surface defects). In order to confirm whether hot scale remains after pickling, after pickling, each steel type was attached to the surface of the specimen using a tape, then removed, and oxides thereon were attached to white paper, and then the whiteness was measured according to color difference analysis. In this case, the case where the whiteness was 95% or more was marked as 'good', and the case where the whiteness was less than 95% was marked as 'poor.'

TABLE 4

| Steel type | Hot press forming temperature [° C.] | HCl concentration [g/L] | Pickling time [s] | HCl concentration* pickling time [g/L*s] | Remarks |
|---|---|---|---|---|---|
| H | 900 | 200 | 3 | 600 | Comparative Example 4 |
| A | 870 | 180 | 5 | 900 | Example 7 |
| A | 900 | 200 | 20 | 4,000 | Example 8 |
| A | 860 | 180 | 50 | 9,000 | Example 9 |
| A | 920 | 210 | 50 | 10,500 | Comparative Example 5 |
| A | 880 | 200 | 20 | 4,000 | Example 10 |
| G | 880 | 250 | 50 | 12,500 | Comparative Example 6 |

TABLE 5

| Steel type | Plated steel sheet [Relational Expression 1-1] $\frac{Sn_{max}}{Sn_{coat}}$ | [Relational Expression 2] $\int_{x1}^{x2} Sn(x)dx$ [% * μm] | Thickness of Sn-enriched layer [μm] | Hot press formed part [Relational Expression 2-1] $\frac{Sn_{max}}{Sn_{coat}}$ | [Relational Expression 2-2] P1; $\int_{x1}^{x2} Sn(x)dx$ [% * μm] | Thickness of Sn-enriched layer [μm] | Remarks |
|---|---|---|---|---|---|---|---|
| H | 1.58 | 0.024 | 1.4 | 1.96 | 0.036 | 2.3 | Comparative Example 4 |
| A | 8.21 | 0.186 | 7.5 | 8.42 | 0.221 | 9.2 | Example 7 |
| A | 5.04 | 0.098 | 3.8 | 5.50 | 0.106 | 5.0 | Example 8 |
| A | 2.61 | 0.050 | 1.6 | 3.07 | 0.067 | 2.9 | Example 9 |
| A | 1.40 | 0.013 | 0.9 | 1.71 | 0.023 | 1.8 | Comparative Example 5 |
| A | 1.85 | 0.021 | 2.2 | 2.20 | 0.040 | 3.1 | Example 10 |
| G | 1.14 | 0.008 | 0.7 | 1.35 | 0.015 | 1.3 | Comparative Example 6 |

TABLE 6

| Steel type | Surface property | Amount of diffusible hydrogen [ppm] | Amount of P2 P2 [kgf*°] | Impact resistance | Remarks |
|---|---|---|---|---|---|
| H | Poor | 0.356 | 36,039 | Good | Comparative Example 4 |
| A | Good | 0.308 | 44,011 | Good | Example 7 |
| A | Good | 0.325 | 37,538 | Good | Example 8 |
| A | Good | 0.358 | 36,011 | Good | Example 9 |
| A | Good | 0.409 | 34,557 | Poor | Comparative Example 5 |
| A | Good | 0.368 | 35,957 | Good | Example 10 |
| G | Good | 0.415 | 34,300 | Poor | Comparative Example 6 |

As can be seen in Tables 4 to 6, in Comparative Example 4, which does not satisfy the Sn content of the present disclosure and has a product of acid concentration and pickling time of less than 800 g/L*s, the hot scale is not completely removed, so it was confirmed that there is a high possibility of causing the surface defects during the post-processing.

In addition, Comparative Examples 5 and 6 in which the product of the acid concentration and the pickling time exceeded 10,000 g/L*s did not satisfy all of the relational expressions 1-1, 1-2, 2-1, and 2-2, and thus, the hydrogen embrittlement resistance was inferior due to the high amount of diffusible hydrogen in the steel, and at the same time, the impact resistance was also inferior.

On the other hand, in Examples 7 to 10 of the present disclosure, the steel composition and the product of the acid concentration and the pickling time of the present disclosure is in the range of 800 to 10,000 g/L*s, and thus, the relational expressions 1-1, 1-2, 2-1, and 2-2 satisfied the inventive range. As a result, not only the expression characteristics were excellent, but also the amount of diffusible hydrogen in the steel was reduced, so the hydrogen embrittlement resistance was excellent and at the same time, the impact resistance was excellent.

Experimental Example 3

Before reheating the slab, a specimen was prepared in the same manner as in Experimental Example 1, except that the slab was prepared by light pressure at the total reduction amount shown in Table 7 below, and the conditions in Table 7 below were applied. For the specimen, each characteristic was evaluated in the same manner as in Experimental Example 1, and additionally, the thickness of the Mn segregation band in the steel sheet and the Sn content in the Mn segregation band were measured for the plated steel sheet and the hot press formed part, and showed in Table 7 below.

Figure 6:
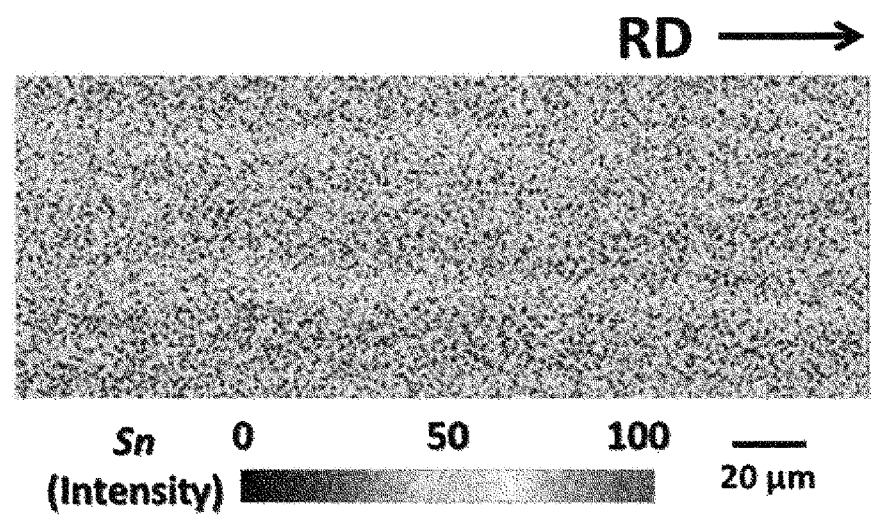
FIG. 6 is diagram illustrating EPMA component mapping results for Sn in the base steel sheet for Example 12 of the present application.

In particular, the thickness of the Mn segregation band and the area of the portion where the average content of Sn is 1.015 times or more of the average content of Sn in the base steel sheet among the Mn segregation bands were measured by the electron probe X-ray micro analyzer (EPMA) method by applying the method described above. An example (Inventive Example 12) of the result of element mapping for Mn and Sn was illustrated in FIGS. 5 and 6, respectively.

In this case, the surface properties, the amount of diffusible hydrogen, and the impact resistance were measured in the same manner as described above.

In addition, in order to additionally evaluate formability, a bending test was performed on the members manufactured from each Example and Comparative Example in Table 7 below. Specifically, when the ratio of fractures is observed by measuring with SEM from the surface down to 100 μm, ductile fractures and cleavage fractures are generated. In this case, when the ratio of the area of the ductile fracture to the total measured area satisfies 70% or more, it was marked as 'O', and when the ratio of the area of the ductile fracture to the total measured area was less than that, it was marked as 'X.'

TABLE 7

| Steel type | Total reduction ratio when continuously casting | Annealing temperature [° C.] | Dew point temperature of annealing [° C.] | Hot press forming temperature [° C.] | HCl concentration [g/L] | Pickling time [s] | HCl concentration* Pickling time [g/L*s] | |
|---|---|---|---|---|---|---|---|---|
| B | 0.40% | 850 | −30 | 900 | 200 | 20 | 4,000 | Example 11 |
| B | 0.52% | 800 | −40 | 920 | 190 | 22 | 4,180 | Example 12 |
| B | 0.70% | 770 | −20 | 900 | 220 | 18 | 3,960 | Example 13 |
| B | 4.10% | 750 | −30 | 880 | 180 | 23 | 4,140 | Example 14 |
| I | 1.30% | 800 | −20 | 890 | 220 | 21 | 4,620 | Comparative Example 7 |
| I | 6% | — | — | — | — | — | — | Comparative Example 8 |

TABLE 8

| Steel type | [Relational Expression 1-1] $\frac{Sn_{max}}{Sn_{coat}}$ plated steel sheet | [Relational Expression 1-2] P1 of plated steel sheet | P1 of [Relational Expression 2-1] $\frac{Sn_{max}}{Sn_{coat}}$ member | [Relational Expression 2-2] $\int_{x_1}^{x_2} Sn(x)dx$ [% * μm] member | Remarks |
|---|---|---|---|---|---|
| B | 2.34 | 0.0274 | 2.40 | 0.034 | Example 11 |
| B | 2.26 | 0.0257 | 2.39 | 0.035 | Example 12 |
| B | 2.18 | 0.0280 | 2.51 | 0.039 | Example 13 |
| B | 2.21 | 0.0257 | 2.44 | 0.032 | Example 14 |
| I | 1.01 | 0.001 | 1.02 | 0.001 | Comparative Example 7 |

Note for column 3: $\int_{x_1}^{x_2} Sn(x)dx$ [% * μm]

TABLE 9

| Steel type | Thickness of Mn segregation band in plated steel sheet [μm] | Ma* | Thickness of Mn segregation in member [μm] | Mb* | Remarks |
|---|---|---|---|---|---|
| B | 20.1 | 58.4 | 30.2 | 58.8 | Example 11 |
| B | 13.4 | 60.6 | 15.0 | 60.2 | Example 12 |
| B | 9.7 | 64.5 | 10.9 | 64.1 | Example 13 |
| B | 3.0 | 66.2 | 4.1 | 67.5 | Example 14 |
| I | 6.7 | 65.0 | 7.0 | 65.6 | Comparative Example 7 |

Ma*: In the plated steel sheet, the area [%] of the portion where the average Sn content is 1.015 times or more of the average Sn content in the base steel sheet among the Mn segregation bands Mb*: In the hot press formed part, the area [%] of the portion where the average Sn content is 1.015 times or more of the average Sn content in the base steel sheet among the Mn segregation bands

TABLE 10

| | | | Amount of P2 | | | |
|---|---|---|---|---|---|---|
| Steel type | Surface property | Amount of diffusible hydrogen [ppm] | P2 [kgf*°] | Impact resistance | Formability | Remarks |
| B | Good | 0.345 | 33,921 | Good | x | Example 11 |
| B | Good | 0.355 | 35,021 | Good | ○ | Example 12 |
| B | Good | 0.339 | 35,369 | Good | ○ | Example 13 |
| B | Good | 0.360 | 38,069 | Good | ○ | Example 14 |
| I | Good | 0.422 | 34,500 | Poor | x | Comparative Example 7 |

As can be seen from Tables 7 to 10, in Comparative Example 7, the added Sn content was less than the inventive range, and Sn was not sufficiently concentrated in the Mn segregation band, resulting in poor impact resistance.

In the case of Comparative Example 8, the total reduction ratio during continuous casting exceeded 5%, and the continuous casting was impossible due to a failure in the rolling pressing machine, and thus experimental evaluation was not possible.

On the other hand, Examples 11 to 14 satisfied the ranges of the relational expressions 1-1, 1-2, 2-1, and 2-2 of the present application, and thus had excellent surface properties and excellent hydrogen embrittlement resistance due to a small amount of diffusible hydrogen.

In particular, among the above-described exemplary embodiments, in the plated steel sheet, the thickness of the Mn segregation band satisfied 20 μm or less (or, in the hot press formed part, the thickness of the Mn segregation band is 15 μm or less), or in the plated steel sheet and the hot press formed part, in the case of Examples 12 to 14 in which the area of the Mn segregation band in which the average Sn content is 1.015 times or more than the average Sn content in the base steel sheet among the Mn segregation bands satisfies 60% or more, compared to Example 11, which does not satisfy at least one of the above conditions, and Comparative Example 7, which does not satisfy all of the above conditions, it was confirmed that the formability is further improved.

From the above-described experiments, according to the present disclosure, even with the addition of the small amount of Sn in steel, hot press forming products having excellent impact resistance as well as resistance to hydrogen delayed fracture due to the reduction of the amount of diffusible hydrogen may be manufactured. These parts may be applied and utilized in various fields including the automobile manufacturing field as structural materials or reinforcing parts.

DESCRIPTION OF REFERENCE SIGNS

1 Plating layer
2 Sn-enriched layer
21: In Sn-enriched layer, Sn content increasing section in X-axis (+) direction
22: In Sn-enriched layer, Sn content increasing section in X-axis (−) direction
3: Base steel sheet
10: Average Sn content line of plating layer
11: Last contact point in X-axis (+) direction of average Sn content line of plating layer and Sn content line by GDS
30: Average Sn content line of base steel sheet
31: Last contact point in X-axis (−) direction of average Sn content line of base steel sheet and Sn content line by GDS
100: Sn content line by GDS
200: Point where Sn content in Sn-enriched layer is maximum value

The invention claimed is:

1. A plated steel sheet for hot press forming, comprising:
a base steel sheet comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities;
an aluminum or aluminum alloy plating layer disposed on at least one surface of the base steel sheet; and
an Sn-enriched layer provided between the base steel sheet and the aluminum or aluminum alloy plating layer,
wherein the plated steel sheet for hot press forming satisfies the following relational expressions 1-1 and 1-2, $$\frac{Sn_{max}}{Sn_{coat}} \geq 1.5 \qquad \text{[Relational Expression 1-1]}$$

where $Sn_{coat}$ denotes an average Sn content in the plating layer, and a unit is weight %, while $Sn_{max}$ denotes a maximum value of the Sn content in the Sn-enriched layer, and the unit is weight %, $$\int_{x1}^{x2} Sn(x)dx \geq 0.015 \qquad \text{[Relational Expression 1-2]}$$

where $Sn(x)$ denotes the Sn content in an X-axis direction from one certain point in the plating layer to the base steel sheet side, x1 denotes an X-axis point at a boundary between the plating layer and the Sn-enriched layer, and x2 denotes the X-axis point at the maximum value of the Sn content in the Sn-enriched layer.

2. The plated steel sheet of claim 1, wherein the thickness of the Sn-enriched layer is 1 μm or more and 20 μm or less.

3. The plated steel sheet of claim 1, wherein the base steel sheet comprises a Mn segregation band, and
in the Mn segregation band, an area of a portion where an average content of Sn is 1.015 times or more compared to the average content of Sn in the base steel sheet is 60% or more.

4. The plated steel sheet of claim 3, wherein a thickness of the Mn segregation band is 20 μm or less.

5. A manufacturing method of a plated steel sheet for hot press forming, comprising:
reheating a steel slab comprising, in weight %, C: 0.07 to 0.5%, Si: 0.05 to 1%, Mn: 0.5 to 5%, P: 0.001 to 0.015%, S: 0.0001 to 0.02%, Al: 0.01 to 0.1%, Cr: 0.01 to 1%, N: 0.001 to 0.02%, Ti: 0.1% or less, B: 0.01% or less, Sn: 0.01 to 0.1%, and a balance of Fe and inevitable impurities at 1050 to 1300° C.;
obtaining a hot-rolled steel sheet by finishing rolling the heated steel slab at 750 to 950° C.;
coiling the hot-rolled steel sheet at 500 to 700° C.;
pickling the wound hot-rolled steel sheet so that a product of an acid concentration and a pickling time is 800 to 10,000 g/L*s;
annealing the pickled steel sheet at 700 to 900° C. in a dew point temperature condition of −75 to +20° C. in an annealing furnace; and
after the annealing, plating the steel sheet by passing the steel sheet through a plating bath made of aluminum or an aluminum alloy.

6. The manufacturing method of claim 5, wherein the concentration of the acid is 40 to 500 g/L.

7. The manufacturing method of claim 5, wherein the pickling time is 5 to 60 seconds.

8. The manufacturing method of claim 5, wherein the pickling temperature is 40 to 120° C.

9. The manufacturing method of claim 5, wherein prior to the reheating step, continuous casting by light reduction at a reduction ratio of 0.5 to 5%.

* * * * *